US009126673B1

(12) United States Patent
Green et al.

(10) Patent No.: US 9,126,673 B1
(45) Date of Patent: Sep. 8, 2015

(54) PATIENT TRANSPORT VEHICLE FLOORING PANEL WITH BUILT-IN ANTI-SLIP TREAD

(71) Applicant: Air Methods Corporation, Englewood, CO (US)

(72) Inventors: Lowell Green, Englewood, CO (US); Jim Fisher, Castle Rock, CO (US)

(73) Assignee: Air Methods Corporation, Englewood, CO (US)

( * ) Notice: Subject to any disclaimer, the term of this patent is extended or adjusted under 35 U.S.C. 154(b) by 243 days.

(21) Appl. No.: 13/764,486

(22) Filed: Feb. 11, 2013

Related U.S. Application Data

(60) Provisional application No. 61/597,733, filed on Feb. 11, 2012.

(51) Int. Cl.
*B32B 3/00* (2006.01)
*B64C 1/18* (2006.01)

(52) U.S. Cl.
CPC ............ *B64C 1/18* (2013.01); *Y10T 428/24174* (2015.01); *Y10T 428/24182* (2015.01); *Y10T 428/24273* (2015.01)

(58) Field of Classification Search
CPC ............... Y10T 428/24174; Y10T 428/24182; Y10T 428/24273; A47L 23/266

USPC ................................................... 428/156, 131
See application file for complete search history.

(56) References Cited

U.S. PATENT DOCUMENTS

| | | | |
|---|---|---|---|
| 4,483,499 A | 11/1984 | Fronk | |
| 4,596,729 A * | 6/1986 | Morrison | 428/44 |
| 5,827,022 A | 10/1998 | Tovani | |
| 6,923,606 B2 | 8/2005 | Fehrle et al. | |
| 7,093,798 B2 | 8/2006 | Whelan et al. | |
| 7,195,201 B2 | 3/2007 | Grether et al. | |
| 7,503,571 B2 | 3/2009 | Cromie | |
| 8,460,775 B2 * | 6/2013 | Engelhardt | 428/68 |

* cited by examiner

*Primary Examiner* — Brent O'Hern
(74) *Attorney, Agent, or Firm* — Marsh Fischmann & Breyfogle LLP

(57) ABSTRACT

A flooring system positionable over a base platform in the cabin of a vehicle such as an aircraft. In one embodiment, the flooring system includes one or more flooring panels each having top and bottom portions, where the top portion defines a top surface including an anti-slip tread. Additionally or alternatively, the flooring system may be made up of a plurality of flooring panels that are adapted to meet at respective interface regions so as to limit fluid passage through the interface regions. In one arrangement, one flooring panel may be separated from an adjacent flooring panel to expose a wiring trough underneath the one flooring panel free of separating the adjacent flooring panel from the aircraft base platform.

16 Claims, 18 Drawing Sheets

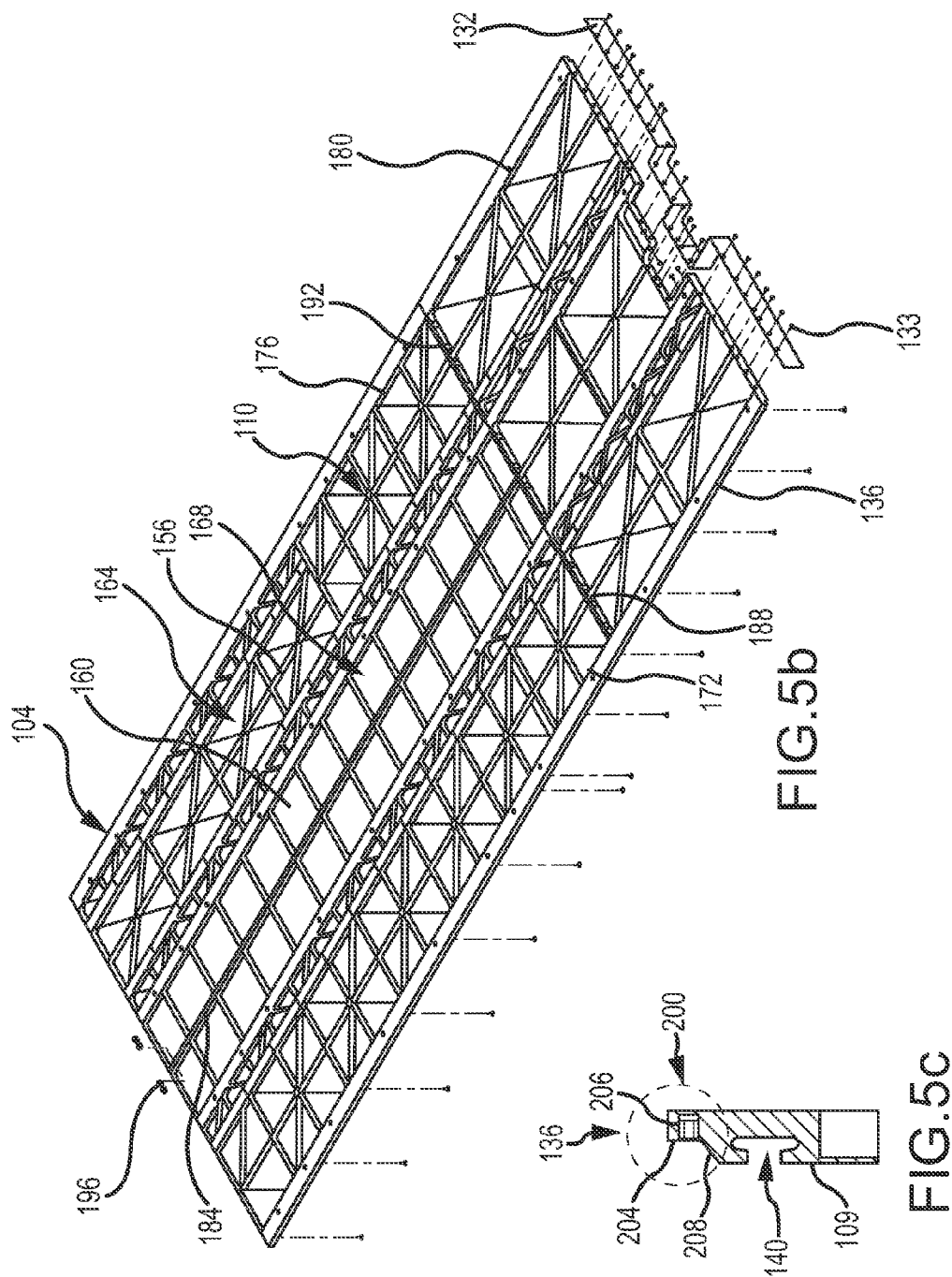

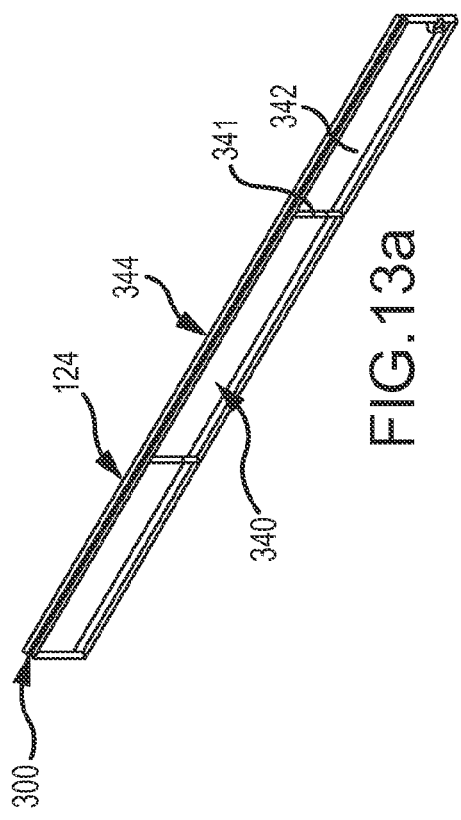
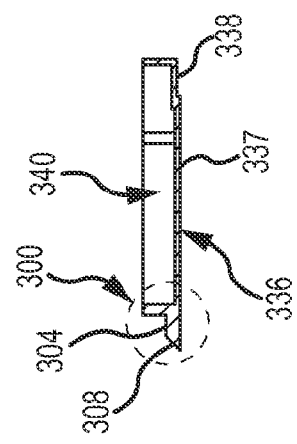
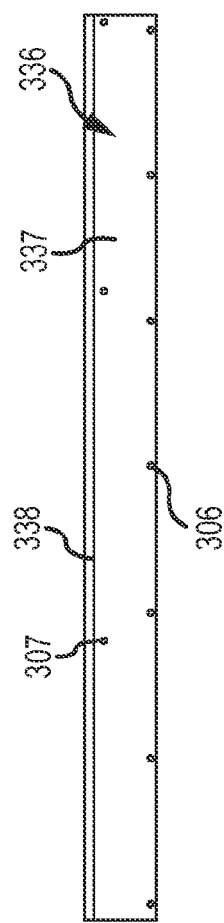

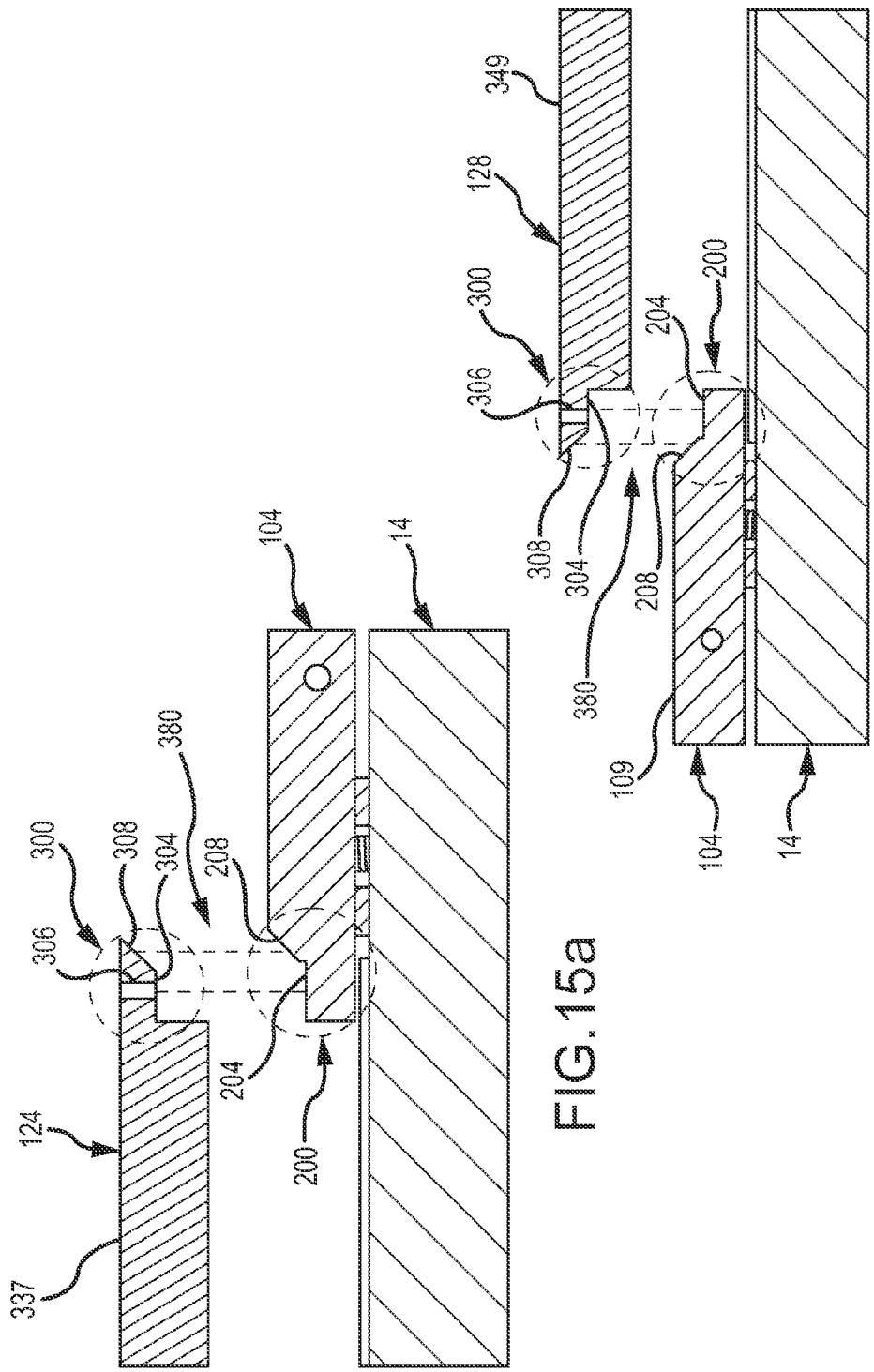

PATIENT TRANSPORT VEHICLE FLOORING PANEL WITH BUILT-IN ANTI-SLIP TREAD

RELATED APPLICATIONS

This application claims priority to U.S. Provisional Patent Application No. 61/597,733, filed Feb. 11, 2012, entitled "MODULAR FLOORING SYSTEM FOR A PATIENT TRANSPORT VEHICLE," which application is incorporated herein by reference in its entirety.

FIELD OF THE INVENTION

This invention generally relates to a flooring system for use in a vehicle and, more particularly, to a modular flooring system that is positionable over a base platform of a patient transport vehicle.

BACKGROUND OF THE INVENTION

The air-medical industry has long recognized the importance of providing effective medical attention to a patient during transport of the patient from the emergency site to a permanent medical facility. Aircraft interior space that is not well-planned with respect to emergency equipment location, patient location, attendant accessibility to both the equipment and the patient, access to wiring, and the like can be a detriment to effectively treating the patient or patients. As such, an efficiently designed patient transport aircraft interior is a necessity in the air-medical industry.

Additionally, the air-medical industry has recognized the importance of weight when designing aircraft interiors. Specifically, aircraft components that are unnecessarily heavy may detrimentally affect the balance and performance of a patient transport aircraft. In this regard, the components making up the aircraft interior must be lightweight in a manner that is free of sacrificing strength and durability.

Thus, there is a need for a system of adapting medical equipment, stretchers, and other load members within the interior of a patient transport aircraft that efficiently utilizes available space within the aircraft interior. In addition, the system should be lightweight, strong, easily installable and easily maintainable.

SUMMARY OF THE INVENTION

The present disclosure is directed to a modular flooring system installable or otherwise positionable over a base platform in the cabin of a vehicle such as a medical transport vehicle (e.g., aircraft) and that is adapted to serve or provide a number of needs as will be discussed herein. In one regard, the disclosed flooring system may be designed to inhibit or limit the passage of fluids (e.g., water, bio-contaminates, and the like) and other materials between the cabin on one hand and the base platform, equipment, wiring and other components under the base platform on the other hand. In another regard, the flooring system may in some situations be designed to reduce the likelihood that medical personnel and other users slip and fall within the cabin due to, for instance, fluids that have spilled or dripped onto the floor of the cabin. In a further regard, the flooring system may be designed to serve as an anchoring base for equipment, patient litters, and the like disposed within the vehicle cabin. Still further, the flooring system may be made designed to facilitate installation within the cabin and access to hidden troughs underneath or adjacent the base platform.

In one aspect, a flooring panel for use in overlaying a base platform in the cabin of a vehicle includes a top portion that is adapted to receive a load (e.g., patient litter, chair, etc.) on a top surface thereof and a bottom portion that is disposable against the base platform and that is adapted to support a load received on the top surface. At least a first area of the top surface includes an anti-slip tread or gripping surface including a pattern of projections and grooves. For instance, the tread may be formed directly in the top surface of the panel such as by machining or the like. The flooring panel may be a substantially rigid, single-piece of material that is operable to limit the absorption and/or seepage of fluids therethrough. Additionally, the top surface may be substantially continuous.

Each projection may include at least a first substantially distinct surface that forms a portion of the top surface. For instance, each projection may be in the form of a truncated pyramid having a plurality of substantially distinct side surfaces (e.g., three, four, etc.) extending downward from the first substantially distinct surface to a base surface of the first area. The pattern of projections and grooves may be in any appropriate arrangement. For instance, alternating parallel rows of projections and grooves are envisioned.

The top surface of the panel may also include a number of features that facilitate the positioning or mounting of fasteners (e.g., tie-downs) therein. For instance, the top surface may include a plurality of elongated tracks (e.g., recessed tracks) and/or apertures (e.g., apertures adjoined by slots) disposed therealong (e.g., formed directly into the top surface, as opposed to projecting therefrom, such as via machining the same into the top surface).

The bottom portion of the panel may include a plurality of support members extending away from the top portion and that are adapted to carry a load received on the top surface and transfer the load to the base platform of the vehicle and/or the underlying frame or structure of the vehicle. In one arrangement, a first portion of the plurality of support members may be adapted to support a first predetermined load, a second portion of the plurality of support members spaced from the first plurality may be adapted to support a second predetermined load, and where the first predetermined load is different than the second predetermined load. Additionally, the bottom portion may include a plurality of cavities disposed between adjacent pairs of the plurality of support members that serve to reduce the weight of the flooring panel.

In another aspect, a flooring system for use in overlaying a base platform of a vehicle is disclosed that includes a first flooring panel (e.g., the above-discussed flooring panel) having a top portion, a bottom portion, and a peripheral edge having a first interface portion; and a second flooring panel (e.g., the above discussed flooring panel) having a top portion, a bottom portion, and a peripheral edge having a second interface portion. The first and second interface portions are removably interfaceable with each other at an interface region in a manner that allows the top surface of the first flooring panel to be substantially level with the top surface of the second flooring panel while limiting passage of fluids through the interface region.

For instance, each interface portion may include a lap member or a first substantially distinct surface that generally extends laterally outward from the flooring panel and that is matingly engageable (e.g., in face-to-face relation) with a corresponding lap member so as to increase the rigidity of the flooring system in the interface region. Additionally, each interface portion may include a beveled or second substantially distinct surface (e.g., angled in relation to the top surface of the panel) that is matingly engageable (e.g., in faceto-face relation) with or at least positionable substantially adjacent a corresponding beveled surface so as to increase the resistance to fluid seepage through the interface region. Still further, each interface portion may extend for a substantially entirety of a substantially distinct peripheral edge portion of the respective panel.

Various refinements may exist of the features noted in relation to the various aspects. Further features may also be incorporated in the various aspects. These refinements and additional features may exist individually or in any combination, and various features of the aspects may be combined. In addition to the exemplary aspects and embodiments described above, further aspects and embodiments will become apparent by reference to the drawings and by study of the following descriptions.

DESCRIPTION OF THE DRAWINGS

For a more complete understanding of the present invention and further advantages thereof, reference is now made to the following Detailed Description, taken in conjunction with the drawings, in which:

FIG. 5b is a bottom view of the main flooring panel of FIG. 2.

FIG. 5c is a cross-sectional view through an interface portion of the main flooring panel along the line E-E of FIG. 5a.

FIG. 7 is a top detailed view of an anti-slip tread of FIG. 5a.

FIG. 8 is an isometric view of the anti-slip tread of FIG. 5a.

FIG. 11b is an end elevation view of the left door sill side flooring panel of FIG. 11a.

FIG. 11c is a top plan view of the left door sill side flooring panel of FIG. 11a.

FIG. 12b is an end elevation view of the right door sill side flooring panel of FIG. 12a.

FIG. 12c is a top plan view of the right door sill side flooring panel of FIG. 12a.

FIG. 13a is a bottom perspective view of a left cover side flooring panel of FIG. 3.

FIG. 13b is an end elevation view of the left cover side flooring panel of FIG. 13a.

FIG. 13c is a top plan view of the left cover side flooring panel of FIG. 13a.

FIG. 14b is an end elevation view of the right cover side flooring panel of FIG. 14a.

FIG. 14c is a top plan view of the right cover side flooring panel of FIG. 14a.

FIGS. 15a-15b respectively illustrate partially exploded cross-sectional views through an interface region between the main flooring panel and the left cover side flooring panel and through an interface region between the main flooring panel and the right cover side flooring panel along the lines 15a-15a and 15b-15b of FIG. 3.

DETAILED DESCRIPTION

Reference will now be made to the accompanying drawings, which assist in illustrating the various pertinent features of the various novel aspects of the present disclosure. In this regard, the following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
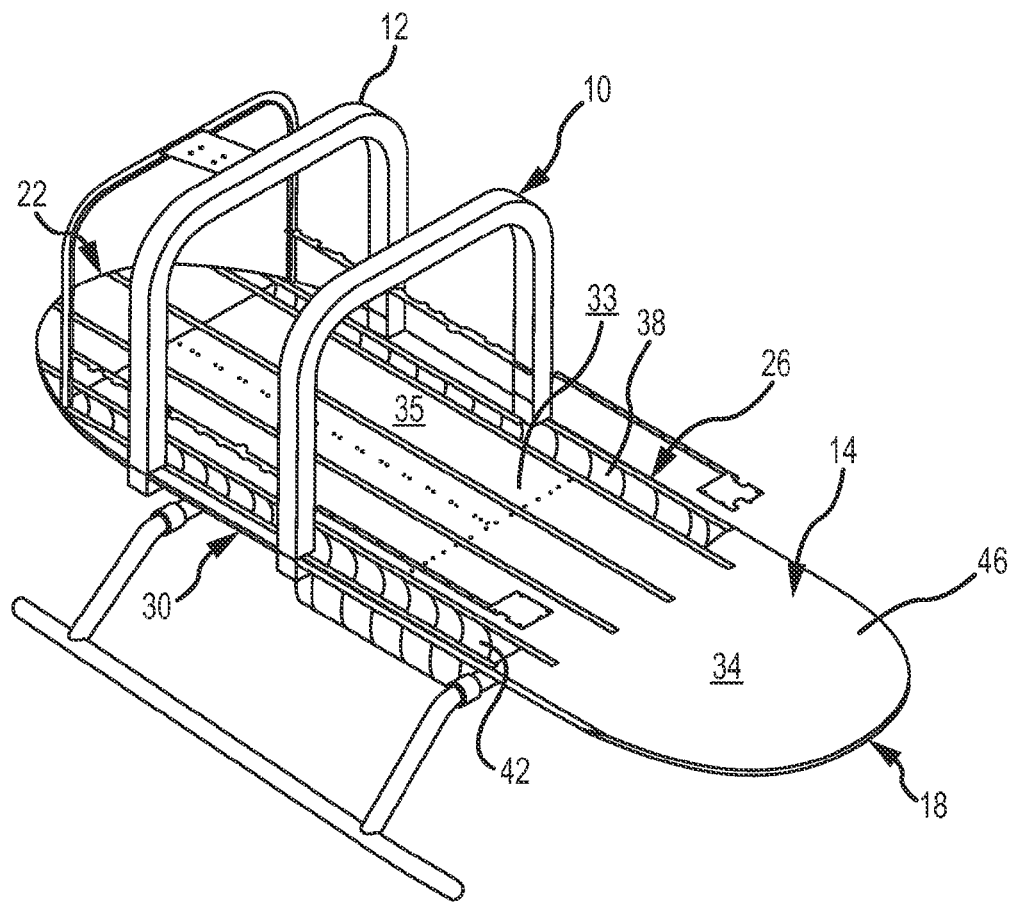
FIG. 1 is a perspective view of an emergency transport vehicle according to one embodiment.

FIG. 1 is a perspective view of an emergency transport vehicle 10 (e.g., an aircraft such as a helicopter) according to one embodiment. The vehicle 10 may generally include any appropriate frame structure 12, a base platform 14 having an upper surface 46, and a cabin 33 including an operator (e.g., pilot) area 34 (e.g., including cockpit seats, controls, etc.), a passenger and equipment area 35 (e.g., including seats for medical personnel, patient litters, supplies, etc.), and the like. The vehicle 10 includes a fore portion 18, an aft portion 22, a left (e.g., port) side 26 and a right (e.g., starboard) side 30.

As also shown in FIG. 1, the vehicle 10 may include at least one trough (e.g., for the routing or wiring and/or other equipment) that is disposed along and/or adjacent at least a portion of the base platform 14, such as a left side trough 38 and a right side trough 42. Each of the troughs 38, 42 may generally be accessed via a top of the troughs 38, 42 at a location that is generally level or flush with the upper surface 46 of the base platform 14. As shown, each of the troughs 38, 42 may include a depth dimension that extends from the top downwardly away from the base platform 14, a length dimension that generally extends along a length of the vehicle 10 between the fore and aft portions 18, 22, and a width dimension that extends along a width of the vehicle 10 between the left and right sides 26, 30. While not shown, each of the wiring troughs 38, 42 may in some situations be concealed by a temporary cover panel (e.g., sheet metal, not shown). Additionally, it should be understood that numerous other components and parts of the vehicle 10 have been removed in the interest of clarity.

Figure 2:
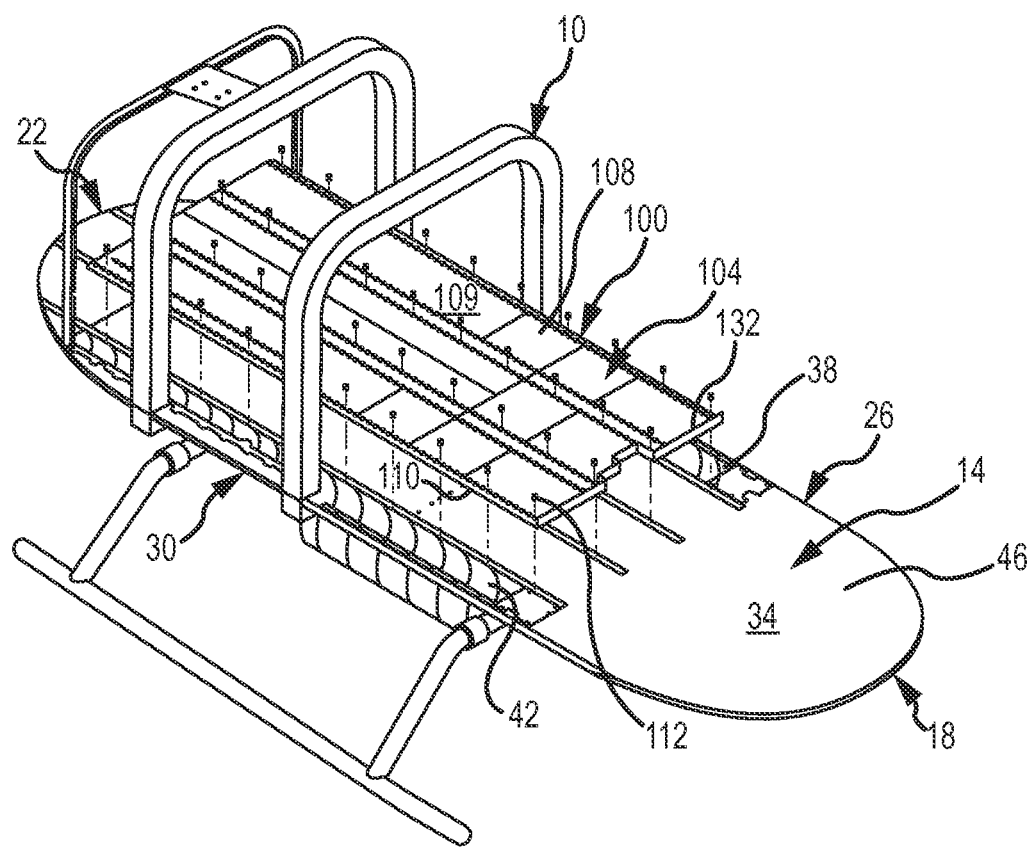
FIG. 2 is a partially exploded perspective view of the aircraft of FIG. 1 and with a main floor panel of a modular flooring system according to one embodiment being installed over a base platform of the aircraft.
Figure 3:
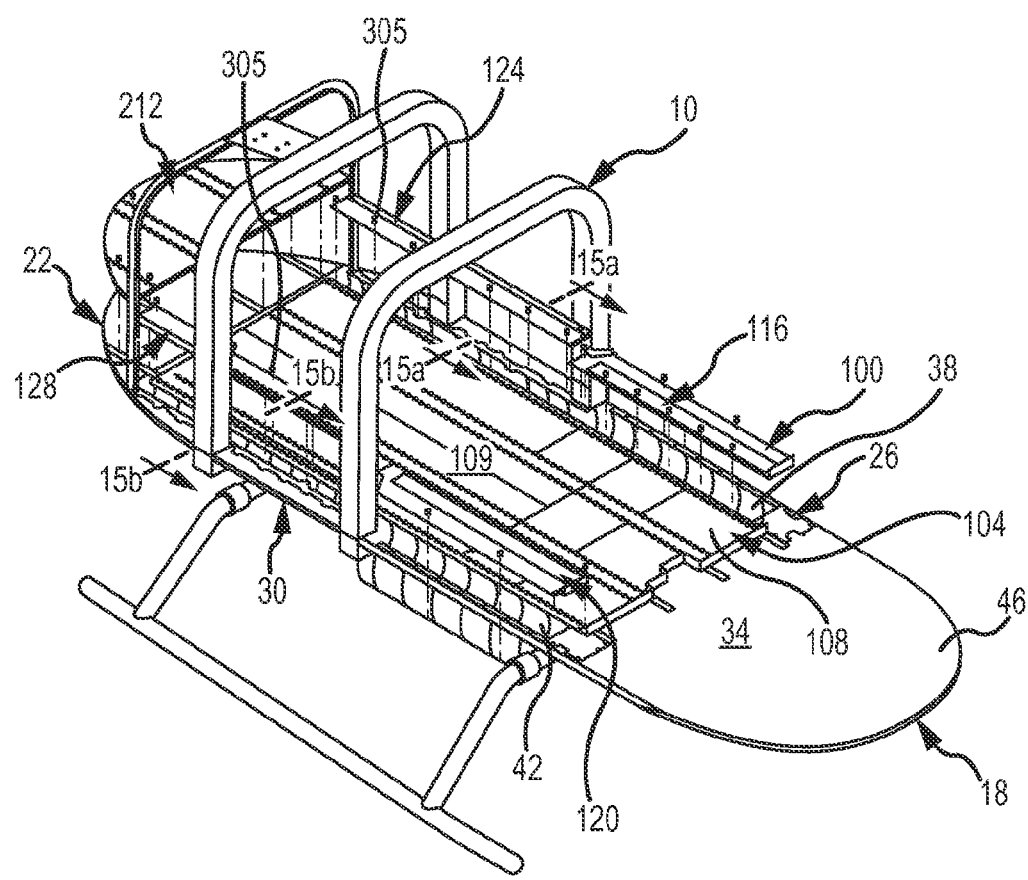
FIG. 3 is a partially exploded perspective view similar to FIG. 2, but additionally showing side and rear flooring panels of the flooring system being installed over the base platform.
Figure 4:
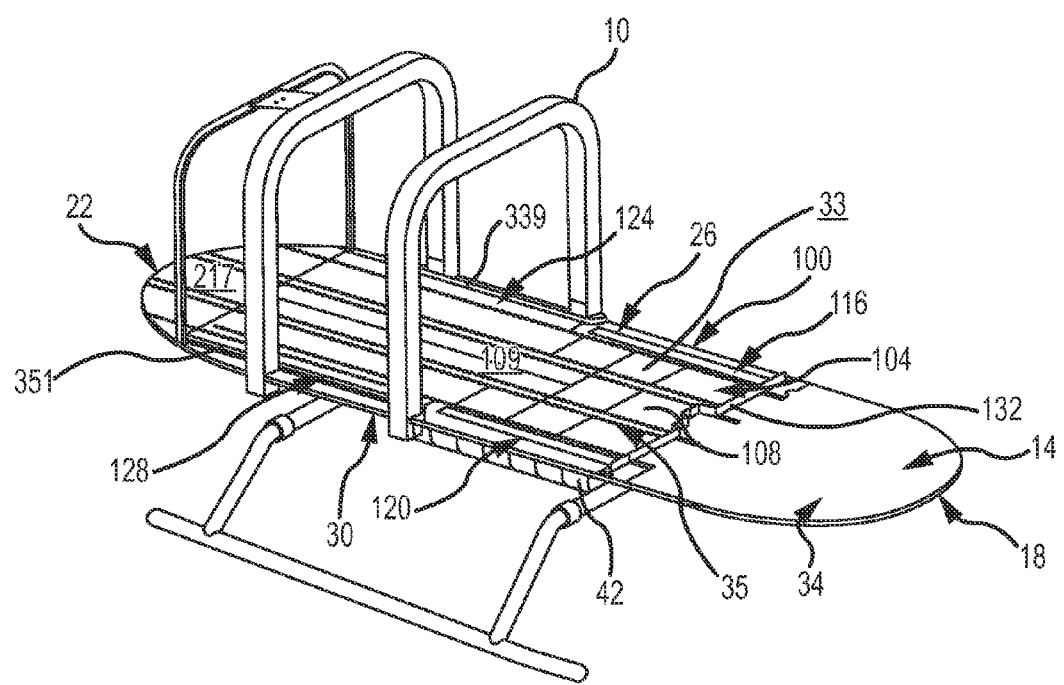
FIG. 4 is a perspective view similar to FIG. 3, but showing the flooring system being mounted over the base platform.

Turning now to FIGS. 2-4, a modular flooring system 100 according to one embodiment is illustrated and generally designed to overlay the base platform 14 of the vehicle 10 to serve a number of purposes. In one regard, the flooring system 100 is operable to serve as a fluid barrier between a) the cabin 33 and b) the base platform 14, equipment, wiring and other components under the base platform 14, and the like. As will be discussed, the flooring system 100 may be made up of a number of modular flooring panels each being of one-piece construction and each of which is adapted to interface with an adjacent flooring panel at a substantially sealed, fluid tight interface region.

In another regard, the flooring system (e.g., in high traffic areas) may include a built-in, anti-skid or anti-slip tread or surface that facilitates desired positioning and movements of medical personnel and equipment within the cabin 33 while facilitating the clean-up and removal of fluids and other materials (e.g., medications, solutions, blood, other bio-contaminates, etc.) that have spilled onto or otherwise come into contact with the flooring system 100. In another regard, the flooring system 100 may include a number of grooves, tracks, apertures, and the like that allow for support members, fasteners, and the like (e.g., ANCRA-style fittings) to be rapidly and securely positionable therein. Numerous other purposes of the flooring system 100 will become evident with respect to the disclosure herein.

Figure 5A:
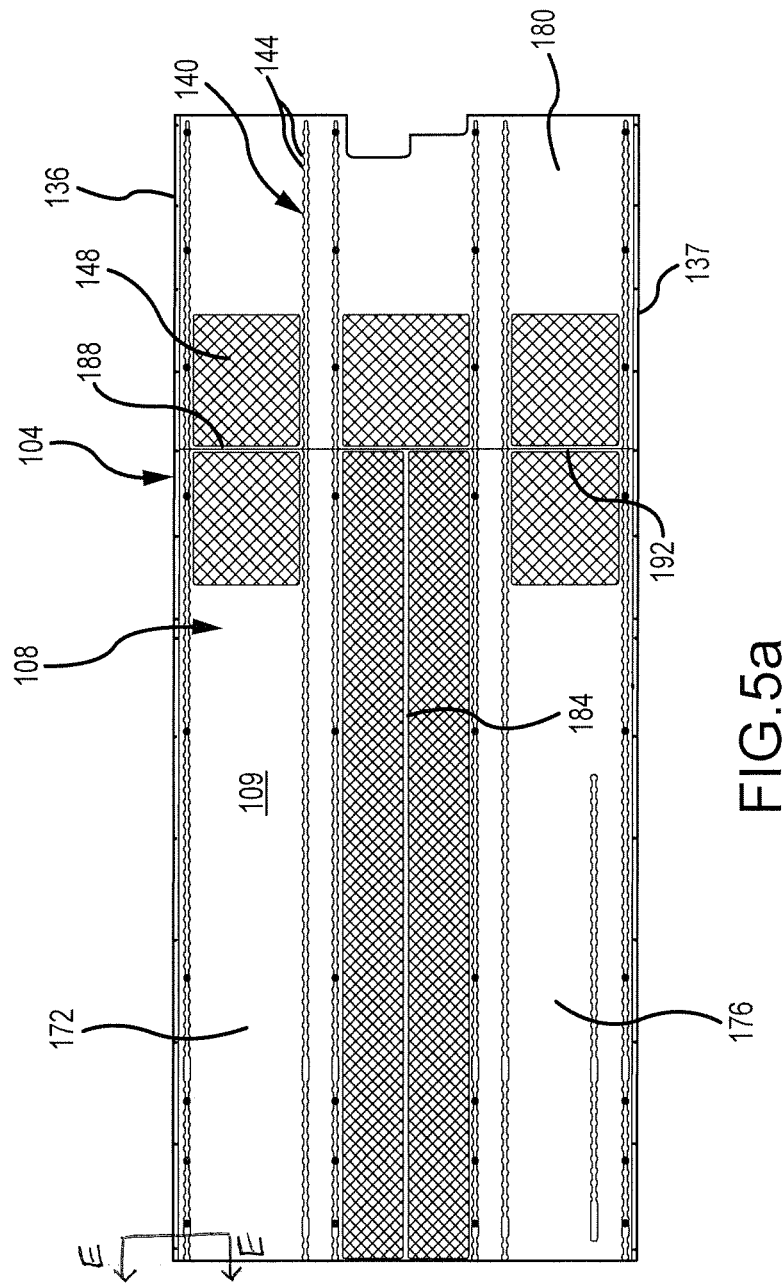
FIG. 5a is a top view of the main flooring panel of FIG. 2.

With initial respect to FIGS. 2 and 5a-5b, the flooring system 100 may include a main flooring panel 104 having a top portion 108 that is adapted to receive a load (e.g., equipment, medical personnel, patients) on a top surface 109 thereof, a bottom portion 110 that is disposable against the upper surface 46 of the base platform 14 in the passenger and equipment area 35 of the cabin 33, and a peripheral edge 136 made up of a number of substantially distinct portions (e.g., on the ends and sides of the main flooring panel 104). The main flooring panel 104 may be secured to the base platform 14 by way of a number of fasteners 112 that may be inserted or threaded through apertures (not labeled) in the main flooring panel 104 and the base platform 14 and engageable with nut plates or the like adjacent a bottom surface (not labeled) of the base platform 14 or other structure. Additionally, the main flooring panel 104 may include any appropriate fluid dam 132 secured (e.g., via fasteners 133 and/or in other manners) to or otherwise formed on the peripheral edge of the main flooring panel 104 that is generally adjacent the beginning of the operator area 34 so as to limit the seepage or passage of fluids into the same.

With additional reference to FIG. 5a, the main flooring panel 104 may include a number of tracks or grooves 140 (e.g., recessed tracks or grooves) disposed along the top surface 109 and sized to receive support members, tie-downs and other fasteners (e.g., for at least temporarily securing equipment such as chairs for emergency personnel, patient litters, and the like within the cabin 33. For instance, FIGS. 16a-16d present plan views of the modular flooring system 100 illustrating various configurations $400_1$, $400_2$, $400_3$, $400_4$ of equipment that may be mounted to the flooring system 100, such as being appropriately secured to one or more of the grooves 140.

In one arrangement, the tracks 140 may be built-in to the main flooring panel 104 (e.g., via any appropriate machining process) and in this regard may be disposed below the top surface 109. For instance, each track 140 may include an alternating series of apertures 144 and "necked-down" slots (not labeled) such that a fastener can be inserted through an aperture 144, slid into one of the slots, and then secured to the main floor panel 104. The tracks 140 may be formed within or otherwise positioned about the main flooring panel 104 in any appropriate manner to provide numerous options for placement of one or more support members within the cabin 33 of the vehicle 33. While the figures illustrate the main flooring panel 104 as including a plurality of generally parallel tracks 140 configured to extend between the fore and aft portions 18, 22 of the vehicle 10, it is to be understood that numerous other configurations and arrangements of tracks 140 are envisioned and encompassed within the scope of the present disclosure.

To serve as a base for support members, tie-downs and other fasteners as well as substantially inhibiting the absorption of fluids, the main flooring panel 104 (as well as other flooring panels disclosed herein) may be constructed of any appropriate rigid material such as aluminum, titanium, composites, alloys, and the like. In one arrangement, the main flooring panel 104 may be a single piece of material that is largely devoid of slots, openings, or other apertures that extend all the way through the main flooring panel 104 between the top and bottom portions 108, 110 (e.g., other than the apertures through which the fasteners 112 extend). In another arrangement, the main flooring panel 104 may be made up of a plurality of flooring panels that may be rigidly interconnected to form the main flooring panel 104. As shown in FIGS. 5a-5b, the main flooring panel 104 may in one embodiment include a left panel 172, a right panel 176, and a forward panel 180.

For instance, the left and right panels 172, 176 may be interfaced at a seam 184 and secured together via a number of fasteners 196 inserted through respective aligned apertures (not labeled) disposed through respective peripheral edges of the left and right panels 172, 176. The forward panel 180 may be similarly interconnected to the left and right panels 172, 176 at respective seams 188, 192. In one arrangement, the forward panel 180 may include grooves 140 that are adapted to align with corresponding grooves 140 on the left and/or right panels 172, 176 (e.g., so as to form a plurality of continuous grooves extending along the main flooring panel 104). In any event, once the left, right and forward panels 172, 176, 180 (and/or other combination of panels making up the main flooring panel 104) have been secured together, their top surfaces are substantially level or flush so as to collectively make up the top surface 109 of the main flooring panel 104.

Any appropriate sealing agent or compound may be disposed along at least one of the peripheral edges before securing the same together via the fasteners 196 to substantially completely seal the joint between the panels so as to inhibit or limit fluid passage therethrough. In one arrangement, and although not shown, the peripheral edges of the left, right and forward panels 172, 176, 180 that are to receive the sealing compound may be machined or otherwise formed to include depressions to receive the sealing compound (e.g., to prevent or limit sealing compound from being squeezed out from between the adjacent peripheral edges upon securing the of peripheral edges together). The left, right, and forward panels 172, 176, 180 (or other combination of panels making up the main flooring panel 104 may be secured together outside of the vehicle 10 and then inserted or otherwise brought into the vehicle 10 (e.g., from the aft portion 22, see FIG. 2), or else individually brought into and secured together inside the vehicle 10. In any case, once the main flooring panel 104 has been secured to the base platform 14, it is typically not intended to be separated from or otherwise removed from the base platform 14 (e.g., unless it needs to be as part of retrofitting the vehicle 10 with an alternative flooring system or the like).

With reference to FIG. 5b, the bottom portion 110 of the main flooring panel 104 may include any appropriate arrangement of support members 156 (e.g., ribs) and cavities 160 that are collectively operable to carry and support a load placed on the top surface 109 and transfer the load to the base platform 14 and the underlying structure 12 of the vehicle 10 while reducing the weight of the main flooring panel 104. In one arrangement, the bottom portion 110 may include a first portion 164 of support members that is designed to support a first predetermined load and a second portion 168 of support members that is designed to support a second predetermined load different than the first predetermined load. For instance, the bottom portion 110 may include denser arrangements of support members 156 (e.g., such as the first portion 164) in those areas that are anticipated to be supporting larger loads (e.g., patient litters, equipment, etc.).

Figure 6A:
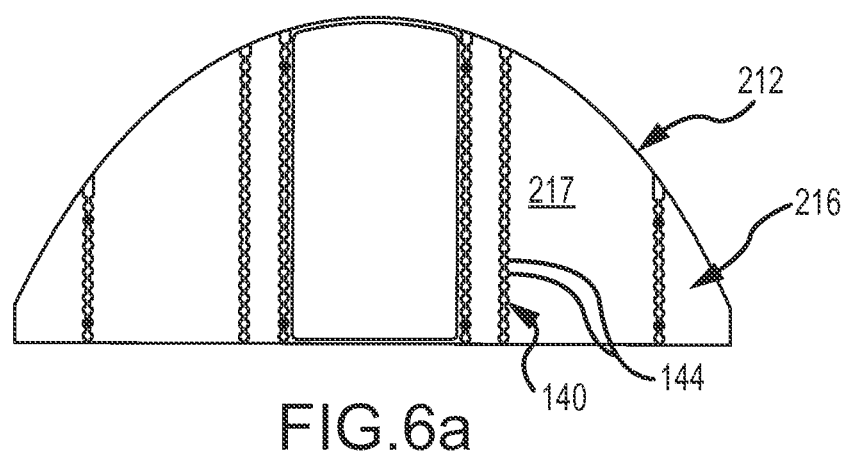
FIGS. 6a-6b respectively show top and bottom view of the rear flooring panel of FIG. 3.
Figure 6B:
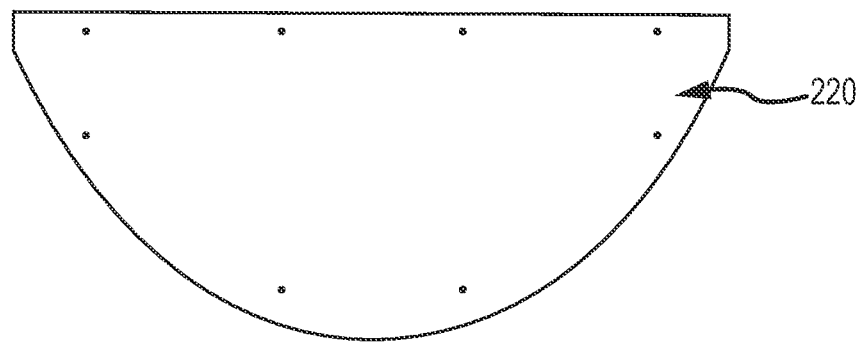
Figure 7:
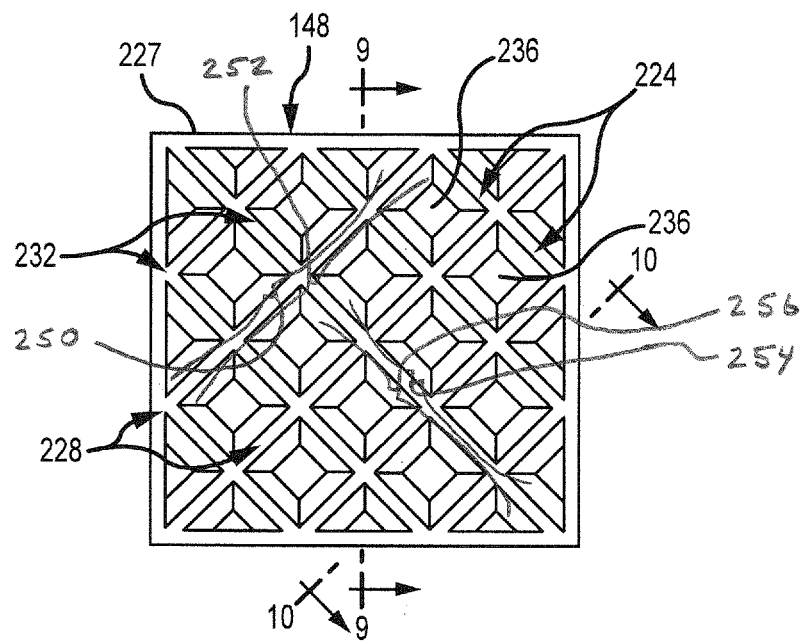
Figure 8:
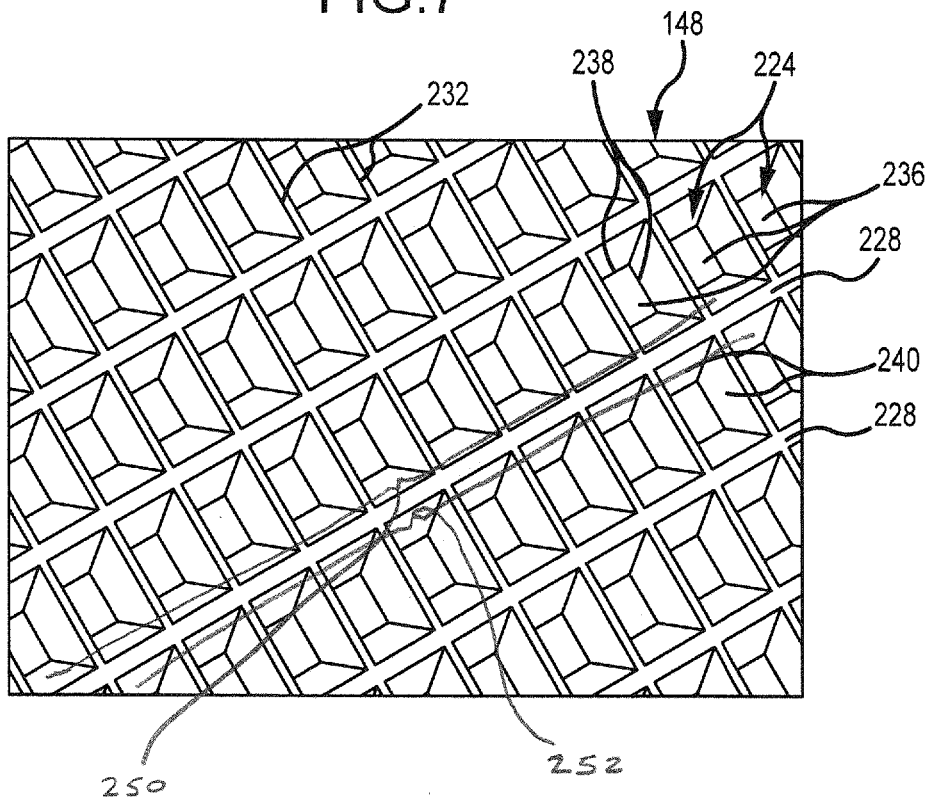

Turning now to FIGS. 3, 6a and 6b, the flooring system 100 may also include a rear flooring panel 212 having a top portion 216 and a bottom portion 220 that is positionable over the upper surface 46 of the base platform 14 and securable to the base platform 14 adjacent the main flooring panel 104 (e.g., via fasteners). The top portion 216 includes a top surface 217 that is operable to be generally level or flush with the top surface 109 of the main flooring panel 104 so as to form a single continuous top surface of the flooring system 100. In one arrangement, any appropriate sealing agent or compound may be disposed between the rear and main flooring panels 212, 104 to substantially completely seal the joint between the panels so as to inhibit or limit fluid passage therethrough.

The rear flooring panel 212 may also include any appropriate arrangement of tracks 140 and/or apertures 144 (e.g., so as to align with those of the main flooring panel 104). In one arrangement, the rear flooring panel 212 may be intended to be substantially non-removable from the base platform 14 similar to the main flooring panel 104 (e.g., unless it needs to be as part of retrofitting the vehicle 10 with an alternative flooring system or the like). In another arrangement, the rear flooring panel 212 may be constructed as one-piece with the main flooring panel 104.

With continued reference now to FIG. 3, the flooring system 100 may also include a plurality of side panels that are broadly operable to cover or otherwise conceal the left and right side troughs 38, 42 (and/or other troughs) of the vehicle 10, form fluid-tight seals with the main flooring panel 104, and be selectively separable from the main flooring panel 104 to expose the left and right side troughs 38, 42 free of separating the main flooring panel 104 from the base platform 14. For instance, the flooring system 100 may include a left "door sill" panel 116 (e.g., positionable adjacent a left door of the vehicle 10, not shown) and a left "cover" panel 124 that are operable to conceal the left side trough 38. The flooring system 100 may also include a right door sill panel 120 (e.g., positionable adjacent a right door of the vehicle 10, not shown) and a right cover panel 128 that are operable to cover the right side trough 42.

With brief reference to FIG. 4, a perspective view of the entire flooring system 100 being positioned over the base platform 14 is presented. In this figure, it can be seen how when the left door sill and cover panels 116, 124 and the right door sill and cover panels 120, 128 are respectively positioned over the left and right side troughs 38, 42, their top surfaces are substantially flush and continuous with the top surfaces 109, 217 of the main and rear flooring panels 104, 212 so as to form a substantially continuous top surface of the flooring system 100. While one arrangement of side panels and troughs will be disclosed herein, it will be understood that other arrangements of the same consistent with the teachings herein are also encompassed within the present disclosure.

With reference to FIGS. 11a-11c and 12a-12c, the left and right door sill panels 116, 120 have respective top portions 312, 324 with top surfaces 313, 325; lower portions 316, 328; and peripheral edges 320, 332 each being made up of a number of substantially distinct portions (e.g., on the ends and sides). When installed or otherwise positioned over the left and right side troughs 38, 42 and interfaced with the main flooring panel 104, the top surfaces 313, 325 are adapted to be substantially level or flush with the top surface 109 of the main flooring panel 104. As shown, the top portions 312, 324 may in some embodiments also include respective ramp surfaces 314, 326 design to facilitate movement of equipment and personnel into and out of the left and right side doors of the vehicle 10. Furthermore, the bottom portions 316, 328 may include any appropriate arrangement of support members 317, 329 and cavities 330, 342 to carry and support loads while reducing the weight of the left and right door sill panels 116, 120.

Turning to FIGS. 13a-13c and 14a-14c, the left and right cover panels 124, 128 have respective top portions 336, 348 with top surfaces 337, 349; lower portions 340, 352; and peripheral edges 344, 356 each being made up of a number of substantially distinct portions (e.g., on the ends and sides). When installed or otherwise positioned over the left and right side troughs 38, 42 and interfaced with the main flooring panel 104, the top surfaces 337, 349 are adapted to be substantially level or flush with the top surface 109 of the main flooring panel 104. As shown, the top portions 336, 348 may in some embodiments also include respective depressions or stepped surfaces 338, 350 to provide a mounting surface for respective fluid dams 339, 351 (see FIG. 4). Furthermore, the bottom portions 340, 352 may include any appropriate arrangement of support members 341, 353 and cavities 342, 354 to carry and support loads while reducing the weight of the left and right cover panels 124, 128.

With respect now to FIGS. 3, 5a-5c, 11b, 12b, 13b, 14b and 15a-15b, the peripheral edge 136 of the main flooring panel 104 may include one or more interface portions 200 that are respectively adapted to interface with one or more corresponding interface portions 300 on the peripheral edges 320, 344 of the left door sill and cover panels 116, 124 and the peripheral edges 332, 356 of the right door sill and cover panels 120, 128 at a number of interface regions 380. Interfacing of the respective interface portions 200, 300 allows the top surfaces of the left door sill and cover panels 116, 124 and right door sill and cover panels 120, 128 to be substantially level with the top surface 109 of the main flooring panel 104 while limiting passage of fluids through the interface regions 380.

With initial reference to FIGS. 5a-5c, each of the side peripheral edge portions of the main flooring panel 104 may include an interface portion 200 including a number of substantially distinct surfaces such as a lap surface or extension member 204 and a beveled surface 208 that is disposed at a particular angle with respect to the top surface 109 (e.g., in the range of 30°-60°, such as about 45°). Turning to FIGS. 11b, 12b, 13b and 14b, at least one of the side peripheral edge portions of the left door sill and cover panels 116, 124 and right door sill and cover panels 120, 128 includes an interface portion 300 having a number of substantially distinct surfaces such as a lap surface or extension member 304 and a beveled surface 308 that is complementary to those of the interface portions 200.

As shown in FIGS. 15a and 15b (exploded cross-sectional views along the lines 15a-15a and 15b-15b in FIG. 3), the interface portion 300 of the left cover panel 124 may be removably interfaceable with one of the interface portions 200 of the main flooring panel 104 at an interface region 380 and the interface portion 300 of the right cover panel 128 may be removably interfaceable with the other interface portion 200 of the main flooring panel at another interface region 380. Specifically, the lap members 204, 304 are matingly engageable or interfaceable to provide strength and rigidity in the interface region 380 between the main flooring panel 104 and the respective side panel and the beveled surfaces 208, 308 are matingly engageable or interfaceable to provide a substantially fluid-tight seal that limits the passage of fluids and other materials through the interface region 380 between the main flooring panel 104 and the respective side panel.

In one arrangement, the main flooring panel 104 may be appropriate laid over and/or secured to the base platform 14 of the vehicle 10. The interface portions 300 of the various side portions may then be laid over respective interface portions 200 of the main flooring panel 104. Specifically, the lap member 304 and beveled surface 308 of a particular interface portion 300 may be respectively brought into contact with or at least abut the lap member 204 and beveled surface 208 of the interface portion 200. In one embodiment, the lap member 304 may be initially rested on the lap member 204. Thereafter, the particular side panel (e.g., the left cover panel 124 of FIG. 15a) may be slid or moved towards the main flooring panel 104 until the beveled surface 308 of the interface portion 300 contacts or at least abuts the beveled surface 208 of the interface portion 200.

To enhance the fluid seal in the interface regions 380, any appropriate sealing member such as a resilient, tape-like gasket (e.g., an elastomeric tape such as TufSeal™ polyurethane tape by Aviation Devices & Electronic Components, LLC of Fort Worth, Tex.) may be positioned along at least one of the beveled surfaces 208, 308 before the beveled surfaces 208, 308 are brought together. In this regard, interfacing of the interface portions 200, 300 serves to sandwich or otherwise compress the sealing component between the beveled surfaces 208, 308 to enhance the fluid seal therebetween. In one variation, the sealing component may be disposed along at least one of the beveled surfaces 208, 308 and along at least one of the lap members 204, 304.

In any event, once the interface portions 200, 300 have been respectively interfaced, fasteners 305 (see FIG. 3) may be appropriately threaded or inserted through corresponding apertures 306, 206 in the interface portions 300, 200. Additionally, fasteners 305 may be threaded or inserted through apertures 307 in the side panels spaced from the interface portions 300 as well as apertures in the base platform 14 and/or vehicle structure 12 to removably secure the side panels to the main flooring panel 104 and the vehicle 10. At this point, a substantially continuous fluid-tight seal exists between the main flooring panel 104 and the left door sill and cover panels 116, 124 as well as between the main flooring panel 104 and the right door sill and cover panels 120, 128 that spans a substantial entirety of the length of the main flooring panel 104 between the fore and aft portions 18, 22 of the vehicle.

When access to the left and/or right side trough 38, 42 is desired, a user may remove the fasteners 305 from the appropriate side panel to allow the interface portions 200, 300 to be separated from each other and then move (e.g., lift, slide) the side panel away from the main flooring panel 104. Of note, the user need not necessarily remove the main flooring panel 104 to gain access to the left and/or right side trough 38, 42. Stated differently, instead of removing the entire flooring system to gain access to the left and/or right side trough 38, 42, the user need only remove the particular side panel covering the particular side trough. This arrangement advantageously facilitates access to the side troughs for service and/or maintenance of wiring and/or equipment of the vehicle 10. The side panel may then be re-interfaced with the main flooring panel 104 as discussed above.

While the lap member 304 of the interface portion 300 has been shown as being disposed above the lap member 204 of the interface portion 200, the interface portions 300, 200 could also be arranged vice versa so that the lap member 204 of the interface portion 200 is disposed above the lap member 304 of the interface portion 300. In the latter situation, the beveled surface 208 of the interface portion 200 may be disposed on the free end of the lap member 204 while the beveled surface 308 of the interface portion 300 may be inset from the free end of the lap member 304. Additionally, the exploded cross sectional views of FIGS. 15a-15b are equally applicable to the interface regions 380 between the main flooring panel 104 and the left and right door sill panels 116, 120 and/or other panels.

One or more portions of the top surface of the flooring system 100 (which includes the top surface 109 of the main flooring panel 104, the top surface 217 of the rear flooring panel 212, and/or the respective top surfaces and/or ramps of the side panels) may include a built-in anti-slip tread 148 (labeled in FIG. 5a) that serves to aid medical personnel in walking within the cabin 33 while facilitating the clean-up and removal of fluids and other materials (e.g., medications, solutions, blood, other bio-contaminates, etc.) that have spilled onto or otherwise come into contact with the flooring system 100. That is, as opposed to anti-slip mats, pads, or the like that would otherwise be laid over or applied to the top surface of the flooring system 100 and which would be susceptible to peeling, damage, contamination, and the like, the anti-slip tread 148 disclosed herein is built into and is of one-piece construction with the top surface of the flooring system 100.

With reference now to FIGS. 7-10, various views of a portion of the anti-slip tread 148 are illustrated. The anti-slip tread 148 may broadly be made up of a pattern or matrix of knobs or projections 224 and grooves 227. In one arrangement, the pattern may include a plurality of rows (e.g., parallel rows) of projections 224 separated by a plurality of grooves 227. For instance, each row of projections 224 may be parallel to and spaced from the other rows of projections 224, and each groove 227 may be parallel to and spaced from the other grooves 227. For instance, the grooves 227 may include a first plurality 228 of grooves and a second plurality 232 of grooves, where the first plurality 228 of grooves is generally perpendicular to the second plurality 232 of grooves. In one arrangement, each groove 227 of the first plurality 228 may be formed by first and second opposing and substantially distinct walls 250, 252 of the panel (e.g., of the main flooring panel 104, rear flooring panel 212, etc.), where the first and second walls 250, 252 diverge away from each other. In one arrangement, each groove 227 of the second plurality 228 may be formed by third and fourth opposing and substantially distinct walls 254, 256 of the panel (e.g., of the main flooring panel 104, rear flooring panel 212, etc.), where the third and fourth walls 254, 256 diverge away from each other. Of course, other patterns of projections 224 and grooves 227 are also envisioned and encompassed within the present disclosure.

The anti-slip tread 148 may be machined directly into one or more portions of the top surface of the flooring system 100. In one arrangement, a drill bit (e.g., countersink drill bit) being rotated at any appropriate speed by a drill may be repeatedly passed through and along the top surface of the particular panel or area (or vice versa where the panel or area is repeatedly passed by the bit) at spaced intervals to form the projections 224 and grooves 227. For instance, a drill bit may be initially operated to form the first plurality of rows of grooves 228. After appropriately repositioning the drill bit and/or the flooring system 100, the drill bit may then be operated to form the second plurality 232 of rows of grooves. In one variation, the anti-slip tread 148 may include a drainage groove 234 or the like that generally surrounds the projections 224 and grooves 227 and intersects the groove 227 to collect fluid drained from the grooves 227 and/or for other purposes (e.g., to facilitate the machining of the anti-slip tread 148).

Figure 9:
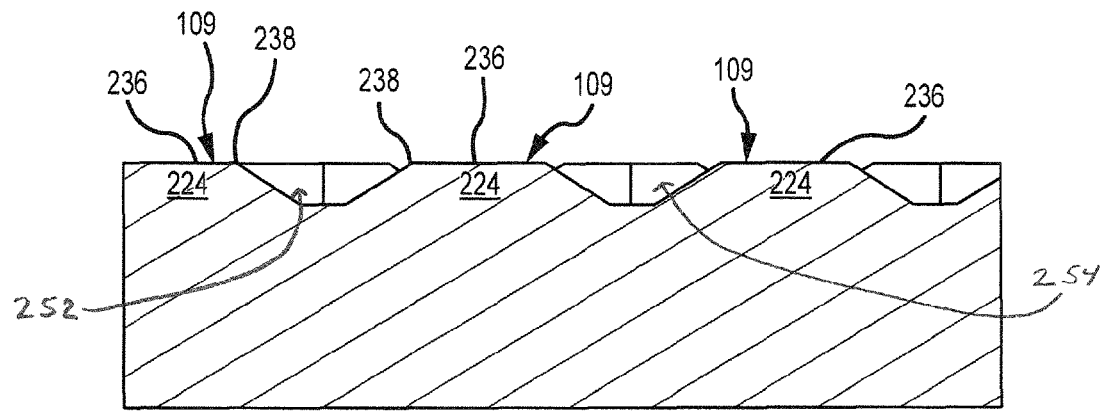
FIG. 9 is a cross-sectional view through the anti-slip tread of FIG. 7 along the line 9-9.
Figure 10:
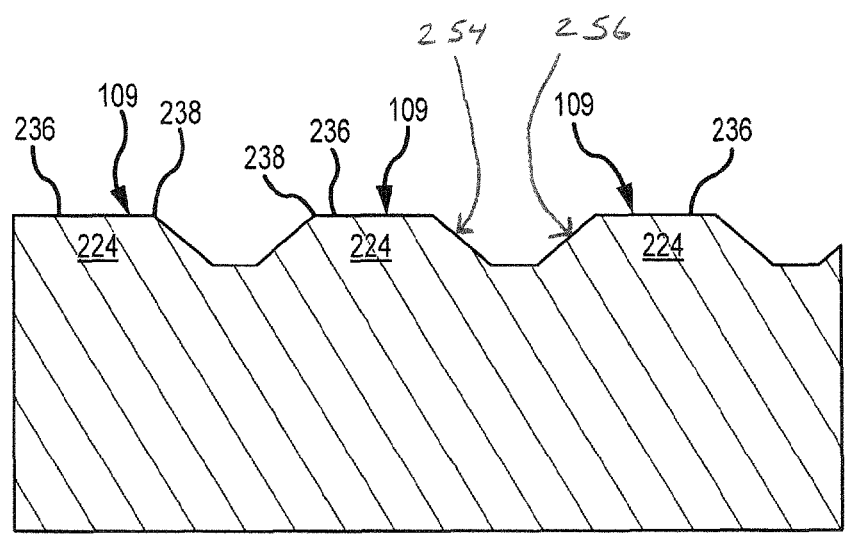
FIG. 10 is a cross-sectional view through the anti-slip tread of FIG. 7 along the line 10-10.
Figure 11A:
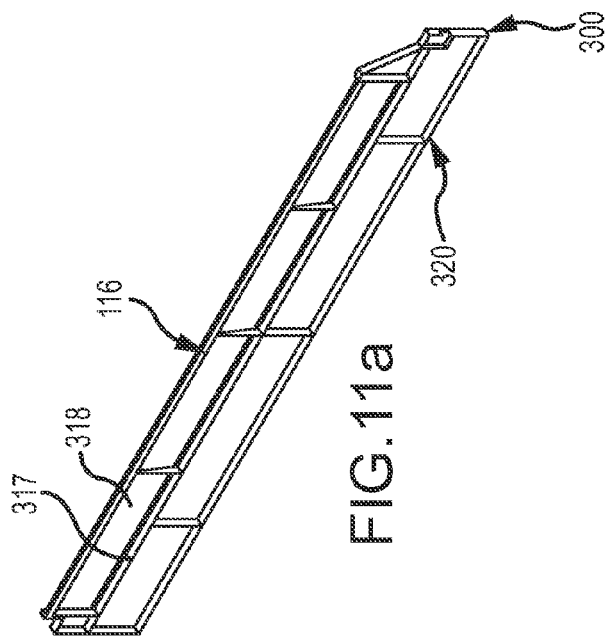
FIG. 11a is a bottom perspective view of a left door sill side flooring panel of FIG. 3.
Figure 11C:
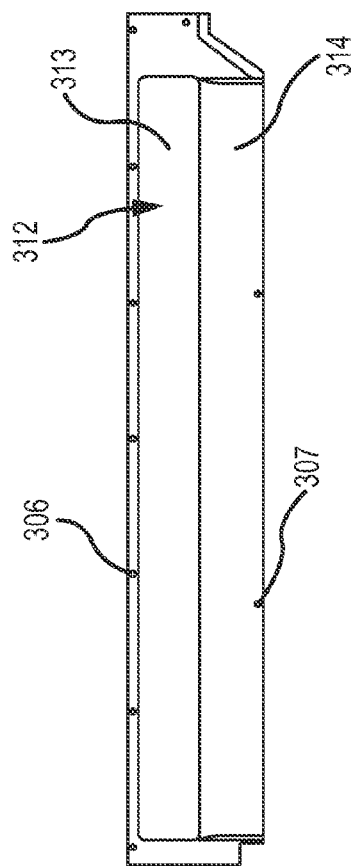
Figure 11B:
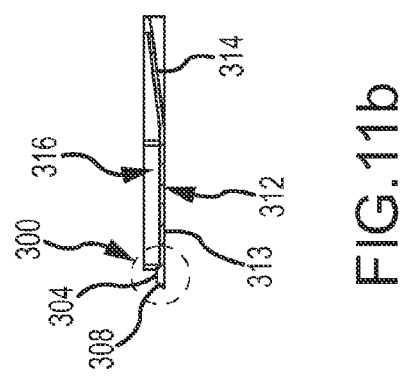
Figure 12A:
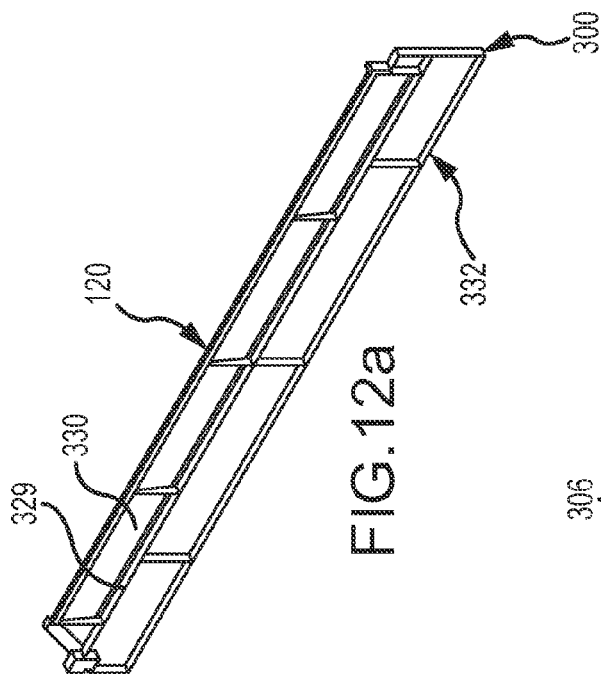
FIG. 12a is a bottom perspective view of a right door sill side flooring panel of FIG. 3.
Figure 12B:
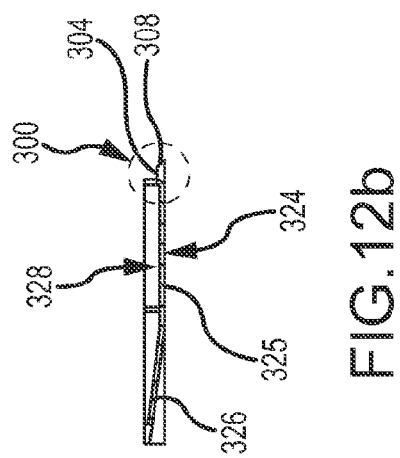
Figure 12C:
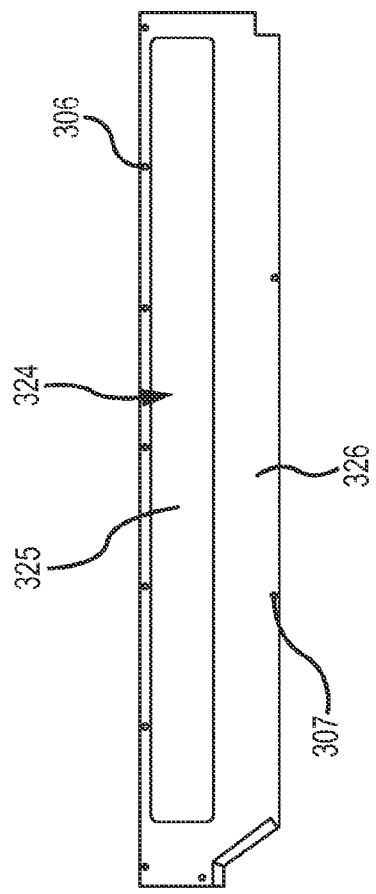
Figure 14A:
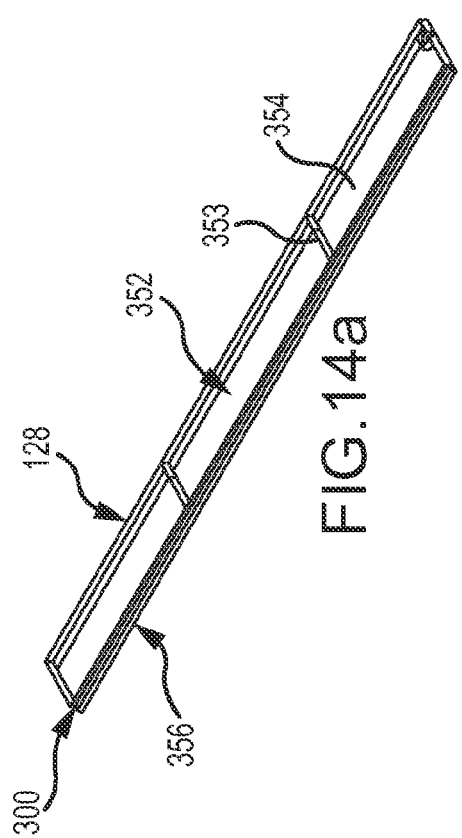
FIG. 14a is a bottom perspective view of a right cover side flooring panel of FIG. 3.
Figure 14B:
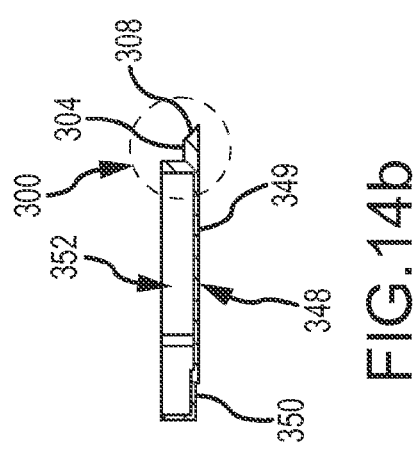
Figure 14C:
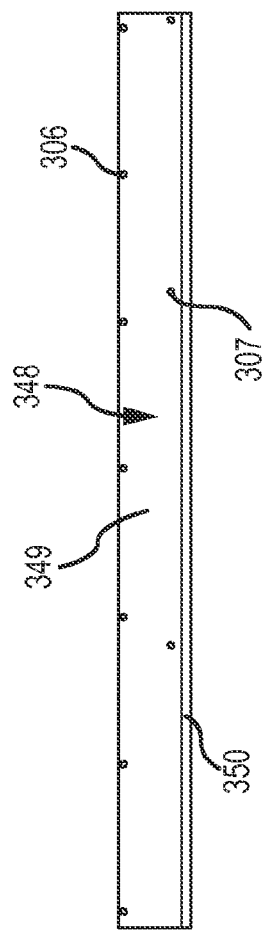
Figure 16A:
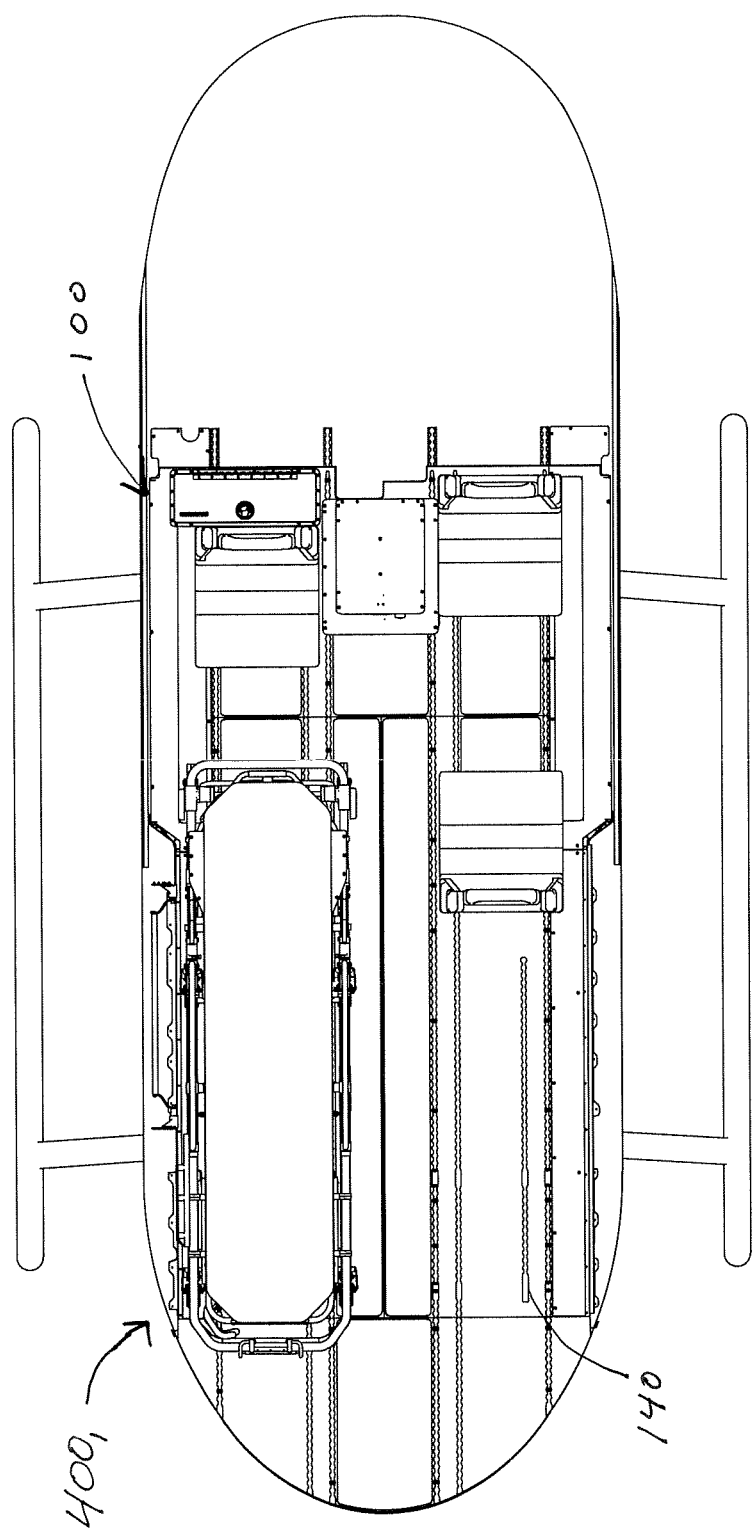
FIGS. 16a-16d are plan views of various configurations of equipment that may be mounted to the modular flooring system of FIG. 4.
Figure 16B:
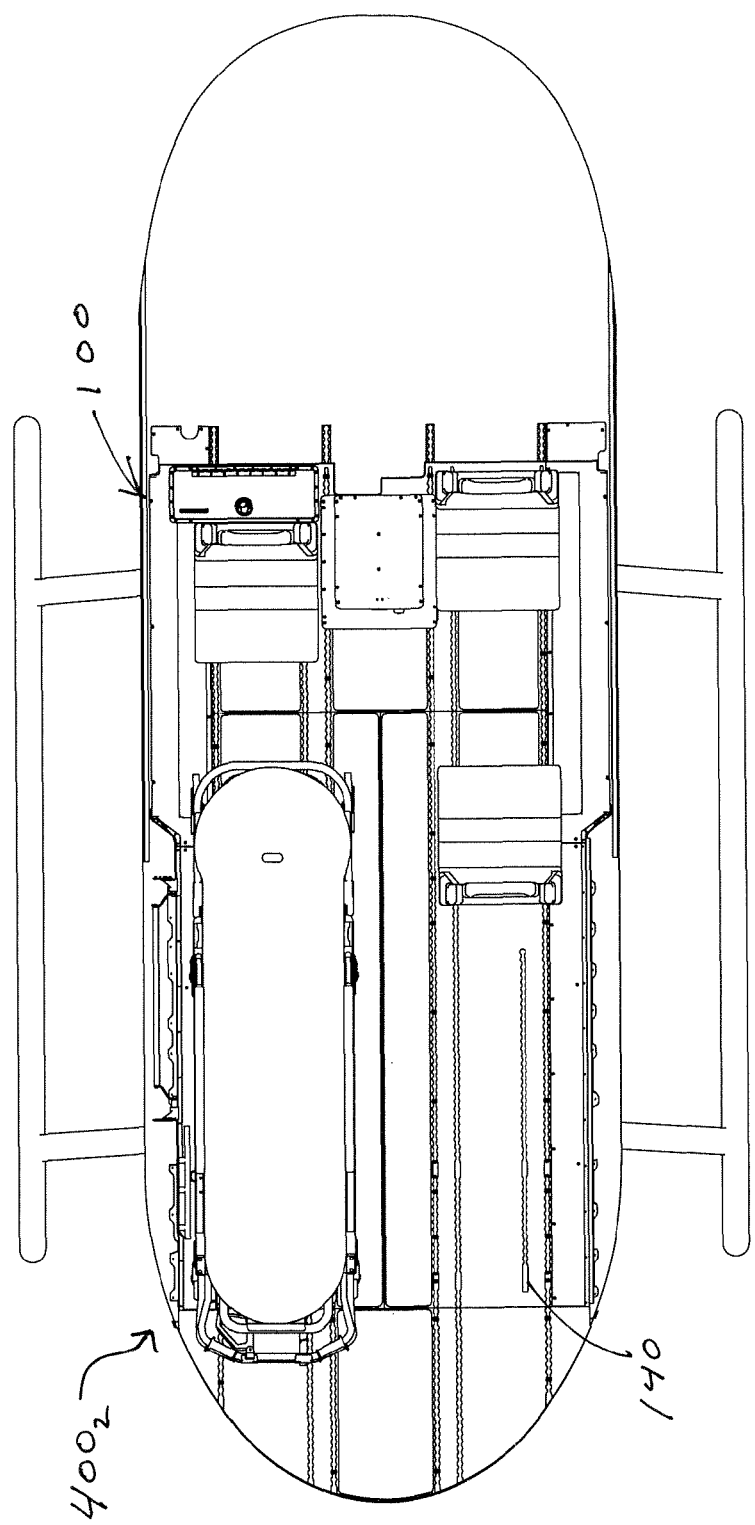
Figure 16C:
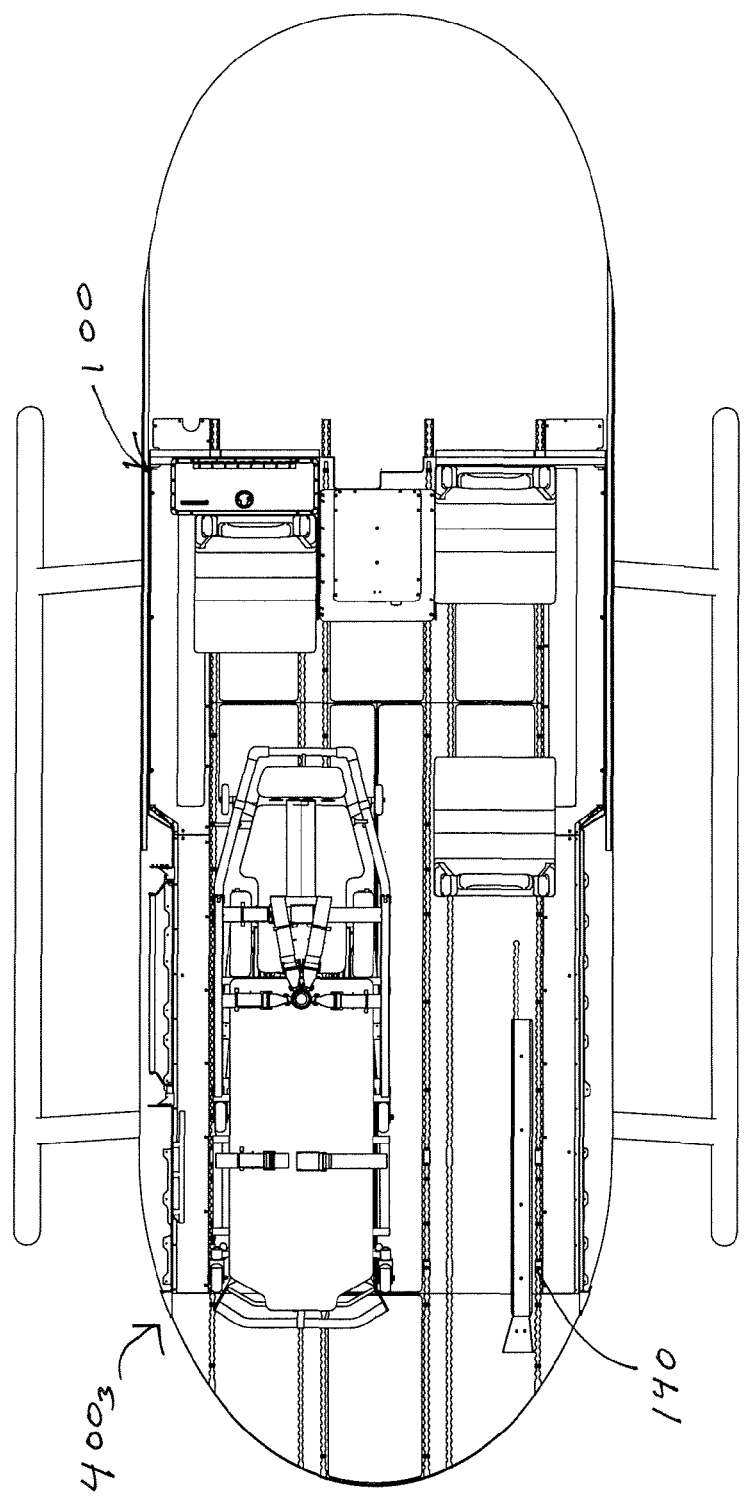
Figure 16D:
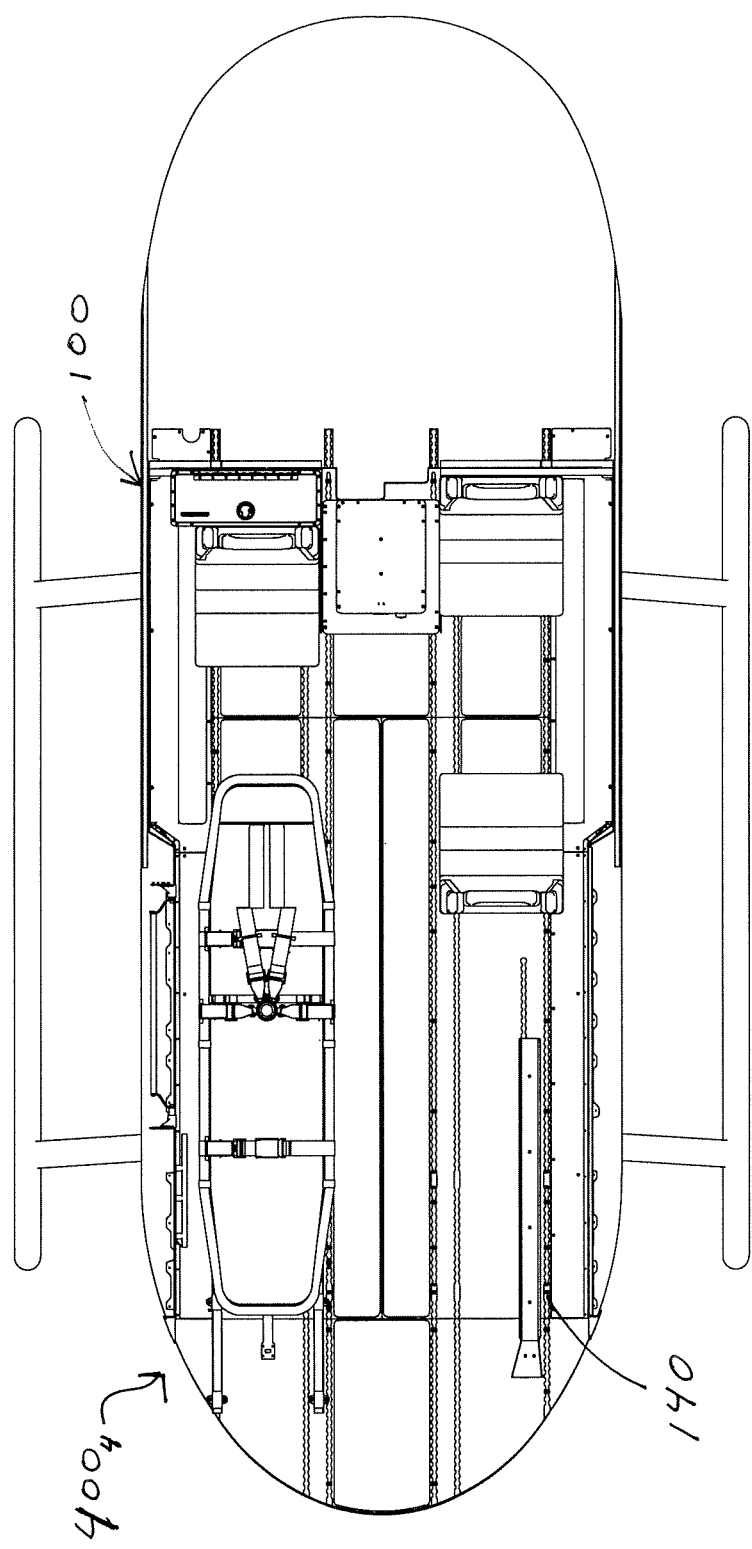

Each projection 224 includes at least a first substantially distinct surface 236 bordered by a number of edges 238 that forms a portion of the top surface of the flooring system 100. With reference to FIGS. 9-10, it can be seen how the various first substantially distinct surfaces 236 of the projections 224 are generally or substantially coplanar. In this regard, the anti-slip tread 148 advantageously serves at least the dual purpose of providing for a substantially level surface to function as the top surface of the flooring system 100 while simultaneously providing for an anti-slip surface in the event that a user's shoe or the like would otherwise begin to slip (e.g., via the shoe or the like contacting edges 238 of the projections 224). In one arrangement, each projection 224 may include a number of additional substantially distinct surfaces 240 that intersect with the top substantially distinct surface 236. For instance, each projection 224 may include three or four additional substantially distinct surfaces 240 and in this regard may have a trilateral or square frusto (e.g., truncated)-pyramidal shape. In one arrangement, each projection 224 may be formed by a portion of each of the first, second, third and fourth substantially distinct walls 250, 252, 254, 256. For instance, each of the substantially distinct surfaces 240 of each projection 224 may form part of the first, second, third and fourth substantially distinct walls 250, 252, 254, 256. Other shapes of projections 224 are also envisioned.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For instance, one or more fluid dams (e.g., such as fluid dam 132 in FIG. 2) may be appropriately positioned within the cabin 33 (e.g., along the peripheral edges of the flooring system 100) so as to limit the spread or seepage of fluid outside of the cabin 33. Furthermore, the flooring system 100 may include more or fewer panels than specifically described herein.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A flooring panel for use in a vehicle having a base platform, wherein the panel is adapted to overlay the base platform, the flooring panel comprising:
   a top portion that is adapted to receive a load on a top surface thereof, wherein at least a first area of the top surface comprises an anti-slip tread built into the top surface and including a pattern of projections and grooves, wherein the pattern of projections and grooves includes:
      a first plurality of spaced grooves that are parallel to each other and that are each formed by first and second opposing, substantially distinct walls of the panel, wherein the first and second walls diverge away from each other;
      a second plurality of spaced grooves that are parallel to each other and that are each formed by third and fourth opposing, substantially distinct walls of the panel, wherein the third and fourth walls diverge away from each other, and wherein the first plurality of grooves is substantially perpendicular to the second plurality of grooves; and
      a plurality of projections between the first and second pluralities of spaced grooves, wherein each of the projections is formed by a portion of the first, second, third and fourth walls, wherein each of the projections includes a planar top surface, and wherein the planar top surfaces of the plurality of projections are coplanar; and
   a bottom portion that is disposable against the base platform of the vehicle and is adapted to support a load received on the top surface.

2. The flooring panel of claim 1, further comprising:
   a plurality of apertures located about the top surface, wherein each aperture is sized to supportably receive a support member positioned therein.

3. The flooring panel of claim 2, further comprising:
   at least one track located along the top surface, wherein the plurality of apertures are located within the at least one track.

4. The flooring panel of claim 1, further comprising:
   at least one track located along the top surface, wherein the at least one track is sized to supportably receive one or more support members positioned therein, and wherein the at least one track comprises a groove disposed within the top surface.

5. The flooring panel of claim 1, wherein the top and bottom portions collectively comprise a single piece of material.

6. The flooring panel of claim 1, wherein each projection has a substantial pyramid shape.

7. The flooring panel of claim 1, wherein the tread comprises a channel that surrounds the pattern, and wherein each of the first plurality of parallel rows of grooves intersects the channel.

8. The flooring panel of claim 5, wherein the single piece of material is rigid.

9. The flooring panel of claim 1, wherein the bottom portion comprises a plurality of support members extending away from the top portion.

10. The flooring panel of claim 9, wherein the bottom portion comprises a plurality of cavities disposed between adjacent pairs of the plurality of support members.

11. The flooring panel of claim 9, wherein a first portion of the plurality of support members is adapted to support a first predetermined load, wherein a second portion of the plurality of support members is adapted to support a second predetermined load, and wherein the first predetermined load is different than the second predetermined load.

12. The flooring panel of claim 11, wherein the first portion of the plurality of support members is spaced from the second portion of the plurality of support members.

13. The flooring panel of claim 1, wherein the top surface is continuous.

14. The flooring panel of claim 1, wherein the top portion is substantially rigid.

15. The flooring panel of claim 1, wherein the top portion comprises a single piece of material.

16. The flooring panel of claim 1, wherein each projection has a truncated pyramid shape.

\* \* \* \* \*